(12) United States Patent
Carretero Benignos et al.

(10) Patent No.: US 11,952,134 B2
(45) Date of Patent: Apr. 9, 2024

(54) ELECTRIC PROPULSION UNIT OF AN AIRCRAFT COMPRISING A COOLING SYSTEM INCORPORATING AT LEAST ONE FRONT AIR INLET AND AIRCRAFT COMPRISING AT LEAST ONE SUCH ELECTRIC PROPULSION UNIT

(71) Applicants: Airbus SAS, Blagnac (FR); Airbus Operations SAS, Toulouse (FR); Airbus Operations GmbH, Hamburg (DE); Airbus Operations S.L., Getafe (ES)

(72) Inventors: Jorge Carretero Benignos, Taufkirchen (DE); Benedikt Bammer, Taufkirchen (DE); Olivier Verseux, Toulouse (FR); Maria Del Sagrario Juanas Fernandez, Toulouse (FR); Jorge Molano Rembiasz, Getafe (ES); Thomas Scherer, Hamburg (DE); Alexander Solntsev, Hamburg (DE)

(73) Assignees: AIRBUS SAS, Blagnac (FR); AIRBUS OPERATIONS SAS, Toulouse (FR); AIRBUS OPERATIONS GMBH, Hamburg (DE); AIRBUS OPERATIONS S.L., Getafe (ES)

( * ) Notice: Subject to any disclaimer, the term of this patent is extended or adjusted under 35 U.S.C. 154(b) by 34 days.

(21) Appl. No.: 17/737,134

(22) Filed: May 5, 2022

(65) Prior Publication Data
US 2022/0355943 A1 Nov. 10, 2022

(30) Foreign Application Priority Data
May 7, 2021 (EP) ..................................... 21172646

(51) Int. Cl.
*B64D 27/24* (2006.01)
*B64D 33/08* (2006.01)

(52) U.S. Cl.
CPC ............. *B64D 27/24* (2013.01); *B64D 33/08* (2013.01)

(58) Field of Classification Search
CPC ........ B64D 27/02; B64D 27/24; B64D 29/00; B64D 33/04; B64D 33/08; B64D 33/10; B64D 2221/00
(Continued)

(56) References Cited

U.S. PATENT DOCUMENTS 2,543,112 A * 2/1951 Lawrence .............. B64D 33/08
  91/367
5,284,012 A * 2/1994 Laborie ..................... F02C 7/12
  60/39.08

(Continued)

FOREIGN PATENT DOCUMENTS

EP 3590827 A1 1/2020
EP 3831718 A1 6/2021
(Continued)

OTHER PUBLICATIONS

European Search Report; priority document.

*Primary Examiner* — Brady W Frazier
(74) *Attorney, Agent, or Firm* — Greer, Burns & Crain, Ltd.

(57) ABSTRACT

An electric propulsion unit of an aircraft including a nacelle housing an electric power system, an electric motor and a cooling system for the electric power system; the nacelle including a central fairing, a front fairing which extends from the central fairing to a front end and a rear fairing which extends from the central fairing to a rear end. The front fairing includes a protrude positioned in a lower part of the front fairing, the protrude having a front face in a (Continued)

transverse plane, a main air inlet of the cooling system being positioned on the front face.

11 Claims, 3 Drawing Sheets

(58) Field of Classification Search
USPC .......................................................... 244/57
See application file for complete search history.

(56) References Cited

U.S. PATENT DOCUMENTS

| | | | |
|---|---|---|---|
| 2006/0180703 A1* | 8/2006 | Zielinski | F28D 7/0066 |
| | | | 244/57 |
| 2015/0232191 A1* | 8/2015 | Wetzel | H01M 10/625 |
| | | | 62/61 |
| 2017/0021937 A1 | 1/2017 | Bustillo et al. | |
| 2017/0037776 A1* | 2/2017 | Jones | F01P 5/04 |
| 2019/0047699 A1* | 2/2019 | Bonden | H01M 10/613 |
| 2019/0063321 A1* | 2/2019 | Morioka | B64D 41/00 |
| 2020/0010208 A1 | 1/2020 | Peace et al. | |
| 2020/0277066 A1 | 9/2020 | Becker et al. | |
| 2020/0277076 A1 | 9/2020 | Becker et al. | |
| 2021/0163142 A1 | 6/2021 | Lacko et al. | |
| 2022/0097862 A1* | 3/2022 | Sugitani | B64D 27/10 |
| 2022/0306305 A1* | 9/2022 | Cottrell | H01M 10/625 |

FOREIGN PATENT DOCUMENTS

| | | |
|---|---|---|
| GB | 2587668 A | 4/2021 |
| WO | 2015136210 A1 | 9/2015 |

\* cited by examiner

ELECTRIC PROPULSION UNIT OF AN AIRCRAFT COMPRISING A COOLING SYSTEM INCORPORATING AT LEAST ONE FRONT AIR INLET AND AIRCRAFT COMPRISING AT LEAST ONE SUCH ELECTRIC PROPULSION UNIT

CROSS-REFERENCES TO RELATED APPLICATIONS

This application claims the benefit of the European patent application No. 21172646.8 filed on May 7, 2021, the entire disclosures of which are incorporated herein by way of reference.

FIELD OF THE INVENTION

The present application relates to an electric propulsion unit of an aircraft comprising a cooling system incorporating at least one front air inlet and to an aircraft comprising at least one such electric propulsion unit.

BACKGROUND OF THE INVENTION

According to one embodiment of the prior art, an electric propulsion unit comprises at least one electric power system, such as a set of fuel cells for example, an electric motor powered by the electric power system, a propeller driven in rotation by the electric motor as well as a nacelle housing the at least electric power system and the electric motor.

During operation, the power supply system generates heat which must be removed. For this purpose, the electric propulsion unit includes a cooling system which includes two cooling circuits positioned for example on both sides of the nacelle.

Each cooling circuit comprises, depending on the direction of the air flow, an air inlet, an intake duct, a heat exchanger, an exhaust duct and an air outlet.

The intake and exhaust ducts are substantially aligned and channel an air flow oriented in a flow direction substantially parallel to the axis of rotation of the propeller, this air flow passing through the heat exchanger oriented substantially perpendicular to the flow direction.

According to a configuration, the air inlet is positioned on the side face of the nacelle and the air outlet at the rear of the nacelle. As the air inlet is positioned on the side face of the nacelle, the cooling circuit includes a fan positioned in the intake or exhaust duct to control the air mass flow in the cooling circuit.

The air inlet, the air outlet, the intake duct and the exhaust duct are sized according to the most important cooling needs of the electrical power system, in particular at the time of take-off when the thrust provided by the electric motor is the most important. As a result, the air inlet, the air outlet, the intake duct and the exhaust duct are oversized for other phases of flight.

Since the aerodynamic performance of the electric propulsion unit is closely linked to the dimensions of the air inlets, this aerodynamic performance is not optimal for most phases of flight.

SUMMARY OF THE INVENTION

The present invention aims to remedy all or some of the drawbacks of the prior art.

To this end, the subject of the invention is an electric propulsion unit of an aircraft comprising:

at least an electric power system,
at least an electric motor powered by the electric power system,
a propeller driven in rotation by the electric motor,
a cooling system for the electric power system comprising a main cooling circuit which comprises:
a main air inlet,
at least one intake duct,
at least one main heat exchanger,
at least an exhaust duct,
a main air outlet,
a nacelle housing the electric power system and the electric motor and comprising:
a central fairing,
a front fairing which extends from the central fairing to a front end and
a rear fairing which extends from the central fairing to a rear end.

According to the invention, the front fairing comprises a protrude positioned in a lower part of the front fairing, the protrude having a front face located approximately in a transverse plane, the main air inlet being positioned on the front face.

Positioning the main air inlet behind the propeller allows air flow to be generated in the main cooling circuit without the need for a fan. Additionally, this positioning does not significantly impact the aerodynamics of the electric propulsion unit.

According to another feature, the front face is located approximately in the same transverse plane that the front end of the front fairing.

According to another feature, the main air inlet occupies the entire front face.

According to another feature, the main air outlet is positioned on the rear fairing and configured to eject an air flow generating an additional thrust.

According to another feature, the main air outlet comprises at least one main flap which is adjustable in order to adjust an air mass flow in the main cooling circuit.

According to another feature, the main heat exchanger comprises an inlet face connected to the intake duct and an outlet face substantially parallel to the inlet face and connected to the exhaust duct, and the inlet and outlet faces of the main heat exchanger are inclined with respect to a transverse plane.

According to another feature, the main cooling circuit is sized for the cooling needs of the electric power system during the cruise flight and the cooling system comprises at least one secondary cooling circuit which comprises a secondary air inlet, at least one intake duct, at least one secondary heat exchanger, at least an exhaust duct, a secondary air outlet, the at least one secondary cooling circuit being sized to increase the cooling capacity of the main cooling circuit.

According to another feature, the central fairing comprises two side faces and the secondary air inlet is positioned on one of the side faces of the central fairing, the secondary air inlet being preferably of flush type.

According to another feature, the secondary air inlet comprises a secondary flap movable between a closed position in which the secondary flap completely closes the secondary air inlet and an at least partially open position in which the secondary flap at least partially clears the secondary air inlet.

According to another feature, the secondary cooling circuit comprises a fan to regulate an air mass flow in the secondary cooling circuit.

According to another feature, the secondary air outlet is positioned at a lower part of the rear fairing, between the main air outlet and the rear end of the rear fairing and configured to eject an air flow generating an additional thrust.

Also a subject of the invention is an aircraft comprising at least one electric propulsion unit according to one of the above features.

BRIEF DESCRIPTION OF THE DRAWINGS

Other features and advantages will emerge from the description of the invention that will follow, the description being given by way of example only, with reference to the appended drawings, in which.

DETAILED DESCRIPTION OF THE PREFERRED EMBODIMENTS

Figure 1:
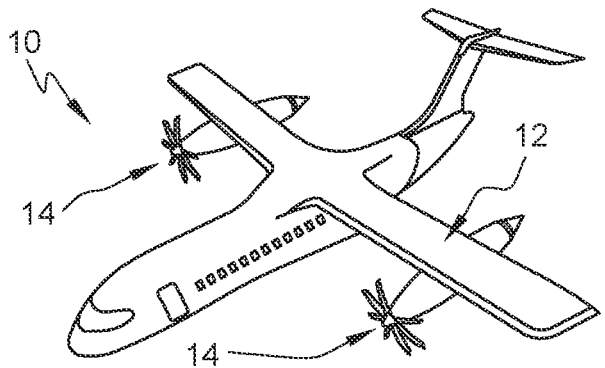
FIG. 1 is a perspective view of an aircraft.
Figure 2:
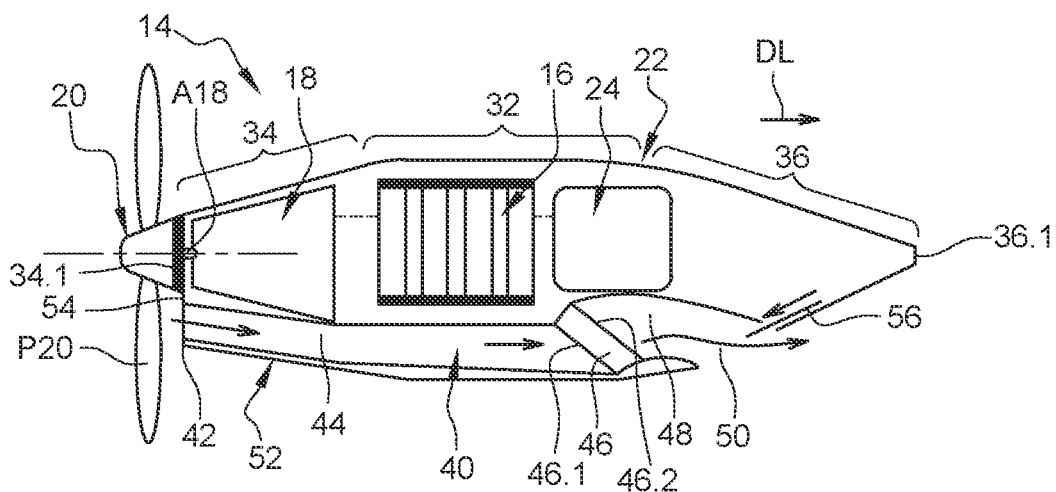
FIG. 2 is a schematic side view of an electric propulsion unit illustrating an embodiment of the invention.

According to an embodiment visible in FIG. 1, an aircraft 10 comprises at least one wing 12 and several electric propulsion units 14 fixed under the wing 12. The invention is not limited to this embodiment for the positioning of the electric propulsion units 14.

As illustrated in FIGS. 4 to 7, each electric propulsion unit 14 comprises at least one electric power system 16 such as a set of fuel cells for example, at least one electric motor 18 powered by the electric power system 16, a propeller 20 driven in rotation by the electric motor 18 as well as a nacelle 22 housing the electric power system 16 and the electric motor 18.

The electric motor 18 includes an output shaft A18 supporting the propeller 20. The propeller 20 comprises several blades P20.

Hereinafter in the description, a longitudinal direction D1 is a direction parallel to the output shaft A18. A transverse plane is a plane perpendicular to the longitudinal direction D1. A vertical median plane P1 is a plane passing through the output shaft A18, vertical when the aircraft is on the ground. The terms "front" and "rear" refer to the direction of the air flow around the electric propulsion unit 14 in flight, the latter flowing from front to rear.

The electric propulsion unit 14 may include at least one auxiliary equipment 24, such as a tank for example.

The nacelle 22 comprises a primary structure 26 supporting the electric power system 16 and the electric motor 18 as well as a secondary structure comprising a fairing 28, supported by the primary structure 26, enveloping the primary structure 26, the electric power system 16 and the electric motor 18 contributing to the aerodynamic performance of the aircraft 10.

The fairing 28 comprises a central fairing 32 with a substantially constant cross section in the longitudinal direction D1, an approximately conical front fairing 34 which extends from the central fairing 32 to a front end 34.1 and an approximately conical rear fairing 36 which extends from the central fairing 32 to a rear end 36.1. According to one embodiment, the electric motor 18 is positioned in the front fairing 34 and the electric power system 16 in the central fairing 32.

According to a configuration, the central fairing 32 comprises two side faces 32.1, 32.2 which are substantially plane and parallel to the vertical median plane P1. The front end 34.1 of the front fairing 34 comprises a hole crossed by the output shaft A18.

The electric propulsion unit 14 includes a cooling system to remove the heat produced by the electric power system 16.

The cooling system comprises a main cooling circuit 40 which comprises, from front to rear, a main air inlet 42, at least one intake duct 44, at least one main heat exchanger 46, at least an exhaust duct 48 and a main air outlet 50.

The main cooling circuit 40 is substantially symmetrical with respect to the vertical median plane P1.

The front fairing 34 comprises a protrude 52 positioned in the lower part of the front fairing 34, the protrude 52 having a front face 54 located approximately in the same transverse plane as the front end 34.1 of the front fairing 34. Thus, the front face 54 is located just behind the blades P20 of the propeller 20.

According to a feature of the invention, the main air inlet 42 is positioned on the front face 54, at least a part of the intake duct 44 being housed in the protrude 52.

Positioning the main air inlet 42 just behind the propeller 20 allows air flow to be generated in the main cooling circuit 40 without the need for a fan. Additionally, this positioning does not significantly impact the aerodynamics of the electric propulsion unit 14.

According to a configuration, the main air inlet 42 occupies the entire front face 54.

The main air outlet 50 is positioned just behind the central fairing 32, in the lower part of the rear fairing 36. The main air outlet 50 being positioning in the rear fairing 36, it is configured to eject an air flow substantially parallel to the longitudinal direction D1 generating additional thrust.

According to an embodiment, the main air outlet 50 comprises at least a main flap 56 configured to at least partially close the main air outlet 50. According to a configuration, the main flap 56 is movable between a closed position in which it completely closes the main air outlet 50 and a fully open position in which it completely clears the main air outlet 50. The main flap 56 can occupy different intermediate positions between the closed and fully open positions. The position of the main flap 56 is adjustable in order to adjust an air mass flow in the main cooling circuit 40. For this purpose, the cooling system comprises a control for controlling the position of the main flap 56.

According to an embodiment, the main heat exchanger 46 comprises an inlet face 46.1 and an outlet face 46.2, substantially parallel to the inlet face 46.1. The intake duct 44 connects the main air inlet 42 and the inlet face 46.1 of the main heat exchanger 46. The exhaust duct 48 connects the outlet face 46.2 of the main heat exchanger 46 and the main air outlet 50.

According to a configuration, the inlet and outlet faces 46.1, 46.2 of the main heat exchanger 46 are not parallel to a transverse plane but inclined. According to an embodiment, the inlet and outlet faces 46.1, 46.2 of the main heat exchanger 46 form an angle greater than 30° with a transverse plane. This configuration makes it possible to increase the section of the main heat exchanger 46 and therefore the exchange surface by limiting the increase in the cross section of the central fairing 32.

According to a feature of the invention, the main cooling circuit is sized for the cooling needs of the electric power system during the cruise flight. Consequently, it is undersized for the most important needs, especially during take-off. Thus, the sections of the main air inlet 42 and the main air outlet 50 are smaller than those of a cooling circuit of the prior art, what tends to reduce the impact on the aerodynamics of the aircraft.

According to an embodiment, the cooling system comprises at least a secondary cooling circuit 58 which comprises, from front to rear, a secondary air inlet 60, at least one intake duct 62, at least one secondary heat exchanger 64, at least an exhaust duct 66 and a secondary air outlet 68.

According to a configuration, the secondary air inlet 60 is positioned on one of the side faces 32.1, 32.2 of the central fairing 32. The secondary air inlet 60 is flush with the outside surface of the nacelle to limit its impact on the aerodynamics of the aircraft.

The secondary air outlet 68 is positioned in the lower part of the rear fairing 36 between the main air outlet 50 and the rear end 36.1 of the rear fairing 36. The secondary air outlet 68 being positioned in the rear fairing 36, it is configured to eject an air flow substantially parallel to the longitudinal direction D1, generating additional thrust.

According to an embodiment, the secondary cooling circuit 58 comprises a fan 70, positioned in the exhaust duct 66, to regulate an air mass flow in the secondary cooling circuit 58 according to the cooling needs of the electric power system 16.

Figure 3:
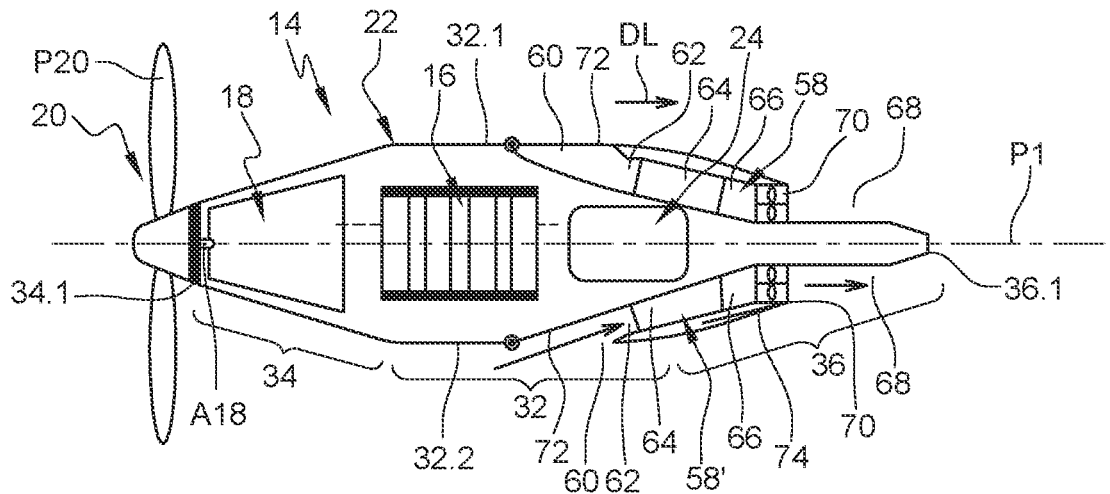
FIG. 3 is a schematic top view of the electric propulsion unit visible in FIG. 2.
Figure 4:
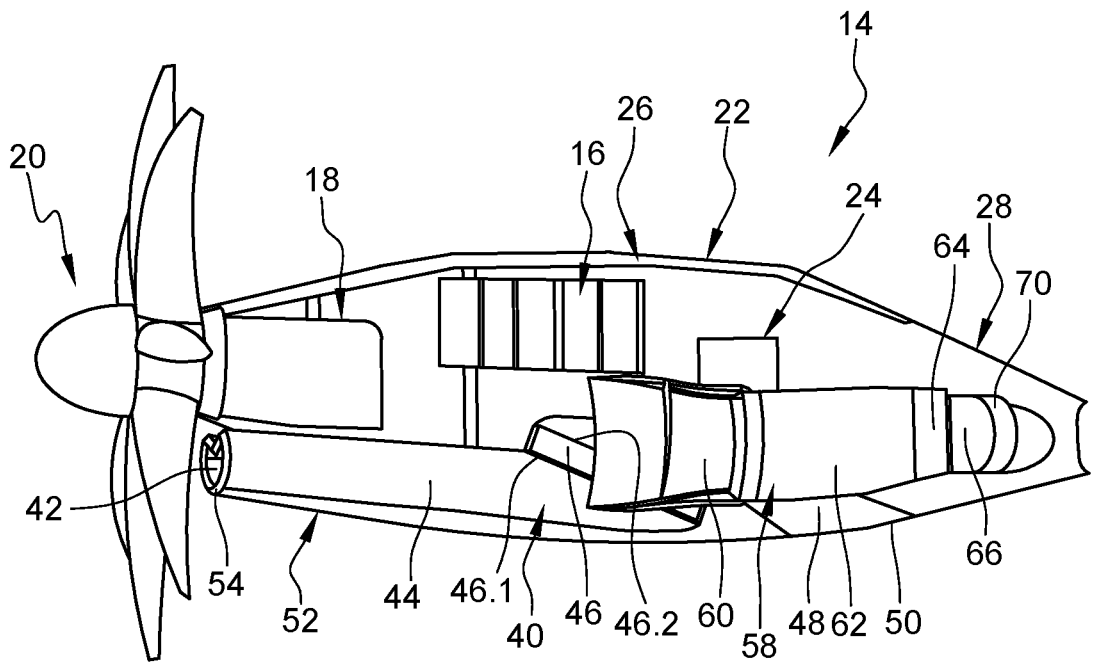
FIG. 4 is a side view of an electric propulsion unit, without a part of its fairing, illustrating an embodiment of the invention.
Figure 5:
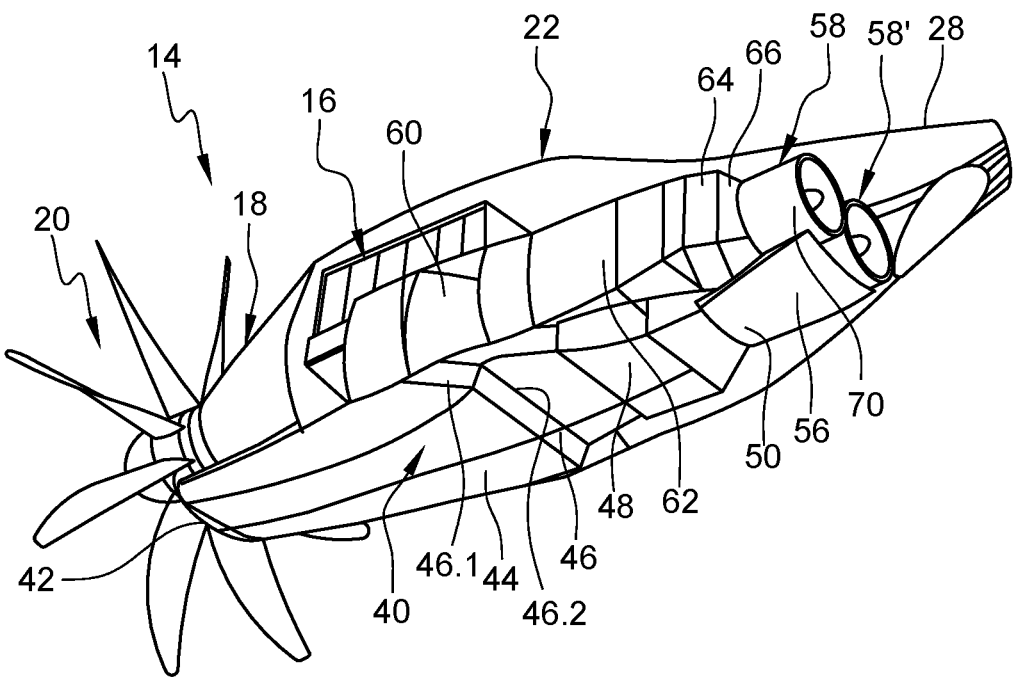
FIG. 5 is a perspective view from the rear of the electric propulsion unit visible in FIG. 4 without a part of its fairing.
Figure 6:
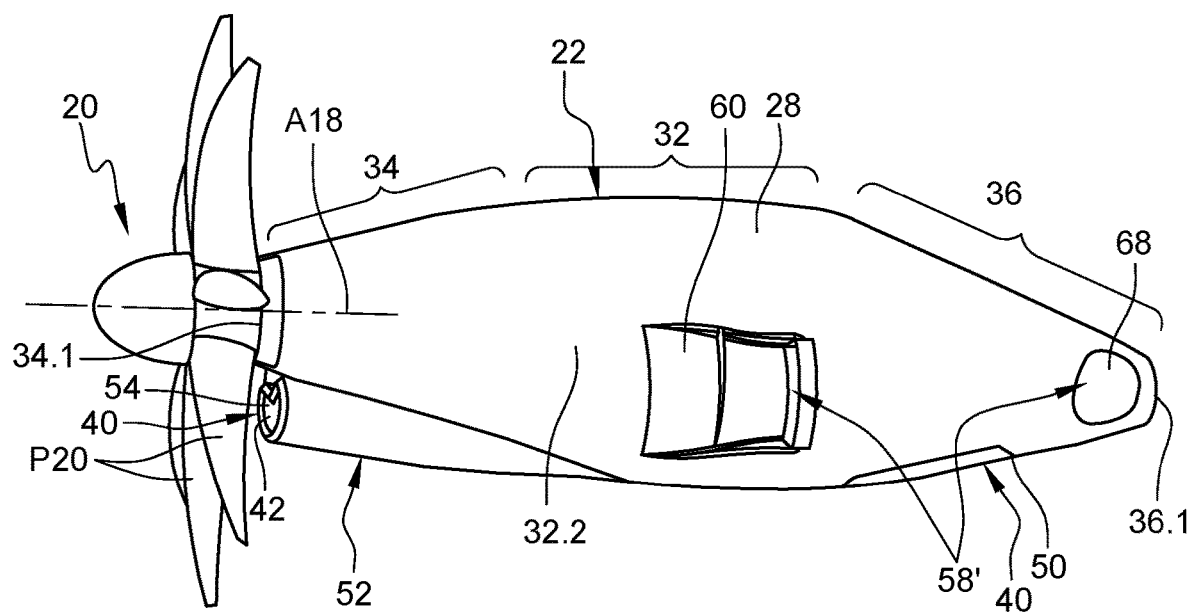
FIG. 6 is a side view of the electric propulsion unit visible in FIG. 4 with its fairing.
Figure 7:
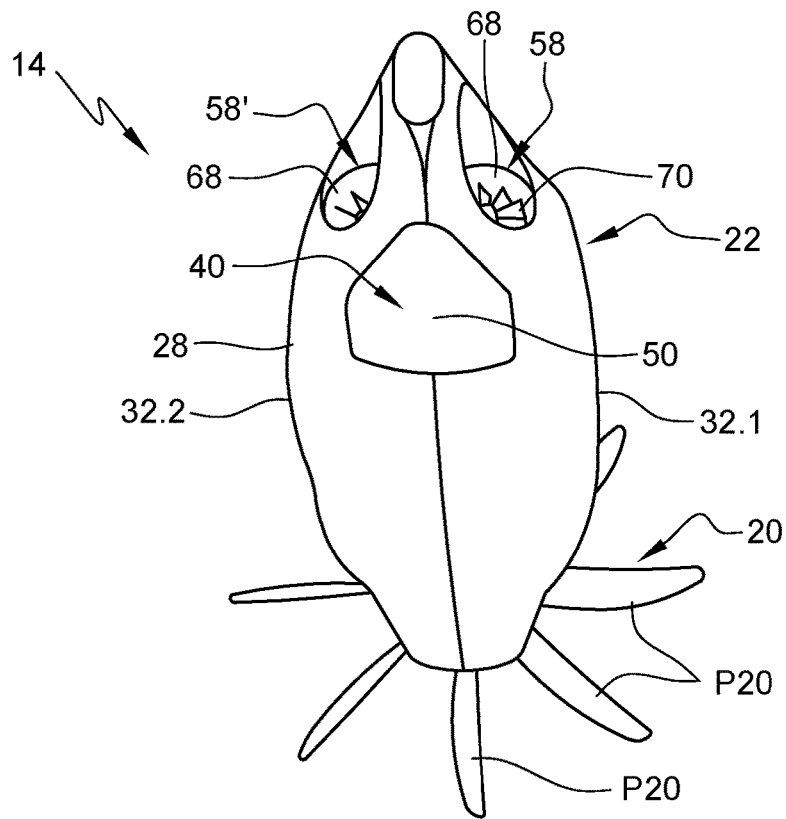
FIG. 7 is a perspective view from the rear of the electric propulsion unit visible in FIG. 4 with its fairing.

According to a configuration, the secondary air inlet 60 comprises a secondary flap 72 movable between a closed position, visible in the upper part of FIG. 3, in which it completely closes the secondary air inlet 60 and an at least partially open position, visible in the lower part of FIG. 3, in which it at least partially clears the secondary air inlet 60. The secondary flap 72 can occupy different intermediate positions between the closed and partially open positions. The position of the secondary flap 72 is adjustable in order to adjust an air mass flow in the secondary cooling circuit 58. When the secondary flap 72 is in the closed position, it greatly reduces the impact of the secondary air inlet 60 on the aerodynamics of the aircraft.

The cooling system comprises a control for controlling the position of the secondary flap 72 which can be the same as that of the main flap 56.

According to a configuration, the secondary air outlet 68 comprises a movable flap 74 to close it when the secondary cooling circuit 58 is not used in order to limit the impact of the secondary air outlet 68 on the aerodynamics of the aircraft.

The secondary cooling circuit 58 is sized to increase the cooling capacity of the main cooling circuit 40 and meet the most important cooling needs of the power supply system 16 during certain phases of flight such as take-offs.

According to a configuration, the cooling system comprises only one secondary cooling circuit 58. According to another configuration visible in FIGS. 3, 5 and 7, the cooling system comprises two secondary cooling circuits 58, 58', arranged on either side of the vertical median plane P1, approximately symmetrical with respect to this vertical median plane P1.

According to an operating principle, the main and secondary cooling circuits 40, 58 operate simultaneously during the take-off and climb flight phases when the cooling needs are the greatest.

The secondary cooling circuit 58 is deactivated, the secondary flaps 72 being in the closed position during the cruising and descent flight phases. Only the main cooling circuit 40, sized for these phases of flight, operates.

At low speed, when the aircraft is on the ground and the propeller 20 is not rotating, at least one secondary cooling circuit 58 can be activated by its fan 70 if cooling is required.

The invention makes it possible to optimize the cooling capacity according to the cooling needs, what contributes to reduce the drag during certain phases of flight such as the cruising phase.

Optimizing the cooling capacity makes it possible to reduce the section of the nacelle and thus to optimize the thrust of the propeller 20.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electric propulsion unit of an aircraft comprising:
at least one electric power system,
at least one electric motor powered by the electric power system and comprising an output shaft,
a propeller driven in rotation by the electric motor,
a cooling system for the electric power system comprising a main cooling circuit which comprises:
a main air inlet,
at least one intake duct,
at least one main heat exchanger thermally connected to the electric power system,
at least an exhaust duct,
a main air outlet,
a nacelle housing the electric power system and the electric motor and comprising:
a central fairing,
a front fairing which extends from the central fairing to a front end, and
a rear fairing which extends from the central fairing to a rear end,
wherein the front fairing comprises a protrude positioned in a lower part of the front fairing, said protrude having a front face located in a transverse plane perpendicular to the output shaft, the main air inlet being positioned on the front face,
wherein the main cooling circuit is sized for the cooling needs of the electric power system during a cruise flight, and
wherein the cooling system comprises at least one secondary cooling circuit which comprises:
a secondary air inlet on a side face of the central fairing,
at least one intake duct, at least one secondary heat exchanger,
at least one exhaust duct, and
a secondary air outlet aft of the main air outlet,
said at least one secondary cooling circuit being sized to increase a cooling capacity of the cooling system.

2. The electric propulsion unit according to claim 1, wherein the front face is located in the same transverse plane as the front end of the front fairing.

3. The electric propulsion unit according to claim 1, wherein the main air inlet occupies the entire front face.

4. The electric propulsion unit according to claim 1, wherein the main air outlet is positioned on the rear fairing and configured to eject an air flow generating an additional thrust.

5. The electric propulsion unit according to claim 1, wherein the main air outlet comprises at least one main flap which is adjustable in order to adjust an air mass flow in the main cooling circuit.

6. The electric propulsion unit according to claim 1, wherein the main heat exchanger comprises an inlet face connected to the intake duct and an outlet face substantially parallel to the inlet face, connected to the exhaust duct, wherein the inlet and outlet faces of the main heat exchanger are inclined with respect to a transverse plane.

7. The electric propulsion unit according to claim 1, wherein the central fairing comprises two side faces, and wherein the secondary air inlet is positioned on one of the side faces of the central fairing, said secondary air inlet being of flush type.

8. The electric propulsion unit according to claim 1, wherein the secondary air inlet comprises a secondary flap movable between a closed position in which the secondary flap completely closes the secondary air inlet and an at least partially open position in which the secondary flap at least partially clears the secondary air inlet.

9. The electric propulsion unit according to claim 1, wherein the secondary cooling circuit comprises a fan to regulate an air mass flow in the secondary cooling circuit.

10. The electric propulsion unit according to claim 1, wherein the secondary air outlet is positioned at a lower part of the rear fairing, between the main air outlet and the rear end of the rear fairing and configured to eject an air flow generating an additional thrust.

11. An aircraft comprising at least one electric propulsion unit according to claim 1.

* * * * *